US012780682B2

(12) United States Patent
Seneviratne et al.

(10) Patent No.: US 12,780,682 B2
(45) Date of Patent: Nov. 3, 2026

(54) METHOD OF MAKING SILVER-IRON TITANATE NANOPARTICLES AND USES THEREOF

(71) Applicant: SRI LANKA INSTITUTE OF INFORMATION TECHNOLOGY, Malabe (LK)

(72) Inventors: Kasun Laknath Seneviratne, Malabe (LK); Imalka Munaweera, Nugegoda (LK); Sriyani Edussuriya Peiris, Malabe (LK); Colin Nisantha Peiris, Malabe (LK); Nilwala Kottegoda, Nugegoda (LK)

(73) Assignee: Sri Lanka Institute Of Information Technology, Malabe (LK)

(*) Notice: Subject to any disclaimer, the term of this patent is extended or adjusted under 35 U.S.C. 154(b) by 0 days.

(21) Appl. No.: 19/230,353

(22) Filed: Jun. 6, 2025

(65) Prior Publication Data

US 2025/0296849 A1 Sep. 25, 2025

Related U.S. Application Data

(62) Division of application No. 17/758,821, filed as application No. PCT/IB2021/053178 on Apr. 16, 2021, now Pat. No. 12,509,360.

(51) Int. Cl.

*C01G 49/00* (2006.01)
*A01P 1/00* (2006.01)

(Continued)

(52) U.S. Cl.

CPC ............ *C01G 49/0018* (2013.01); *A01P 1/00* (2021.08); *B82Y 40/00* (2013.01); *C22C 32/001* (2013.01);

(Continued)

(58) Field of Classification Search

CPC ....... C01G 49/0018; A01P 1/00; B82Y 40/00; C22C 32/001; C22C 5/06; C01P 2002/72;

(Continued)

(56) References Cited

U.S. PATENT DOCUMENTS

| | | |
|---|---|---|
| 2,757,069 A | 7/1956 | Patterson et al. |
| 5,972,098 A | 10/1999 | Andes et al. |

OTHER PUBLICATIONS

V. Rodríguez-González, R. B. Domínguez-Espíndola, S. Casas-Flores, O. A. Patrón-Soberano, R. Camposeco-Solis, and S.-W. Lee, Antifungal Nanocomposites Inspired by Titanate Nanotubes for Complete Inactivation of Botrytis cinerea Isolated from Tomato Infection, Oct. 26, 2016, ACS Appl. Mater. Interfaces, 8, 316 (Yea.*

(Continued)

*Primary Examiner* — Anthony J Zimmer
*Assistant Examiner* — Joshua Maxwell Speer
(74) *Attorney, Agent, or Firm* — Alston & Bird LLP

(57) ABSTRACT

High quality silver-iron titanate nanoparticles are synthesized using an ilmenite source. The silver-iron titanate nanoparticles were characterized using various analytical techniques. As compared to prior art methods, the disclosed methods provide for the simple, cost-effective synthesis of relatively high-quality silver-iron titanate nanoparticles. The silver-iron titanate nanoparticles can be used in a variety of important agricultural, industrial, and hygienic uses, including in the important area of plant tissue culture explant sterilization.

9 Claims, 13 Drawing Sheets

(51) Int. Cl.
*B82Y 40/00* (2011.01)
*C22C 32/00* (2006.01)

(52) U.S. Cl.
CPC ...... *C01P 2002/72* (2013.01); *C01P 2002/82* (2013.01); *C01P 2002/85* (2013.01); *C01P 2004/64* (2013.01); *C01P 2006/80* (2013.01)

(58) Field of Classification Search
CPC .............. C01P 2002/82; C01P 2002/85; C01P 2004/64; C01P 2006/80; C01P 2002/52; B22F 1/054; B22F 9/24
See application file for complete search history.

(56) References Cited

OTHER PUBLICATIONS

Abbasi et al., "Grafting of silver particles on FeTiO3/TiO2/Ag: synthesis and characterization of FeTiO3/TiO2 nanoparticles in presence of CTAB and their application as photocatalyst," Journal of Materials Science: Materials in Electronics, 29:10583-10592, (2018).

Tang et al., "Construction of novel Z-scheme Ag/FeTiO3/Ag/BiFeO3 photocatalyst with enhanced visible-light-driven photocatalytic performance for degradation of Norfloxacin," Chemical Engineering Journal, 351:1056-1066, (2018).

WIPO Application No. PCT/IB2021/0531178, PCT International Search Report and Written Opinion of the International Searching Authority mailed Jan. 11, 2022.

* cited by examiner

Elemental XPS spectra of Ag-FeTiO3-40

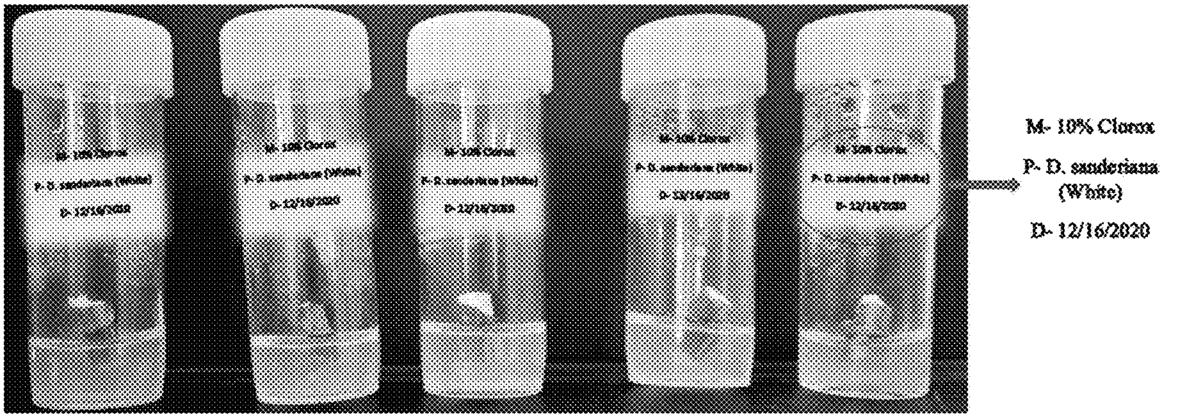
FIG. 11(A)
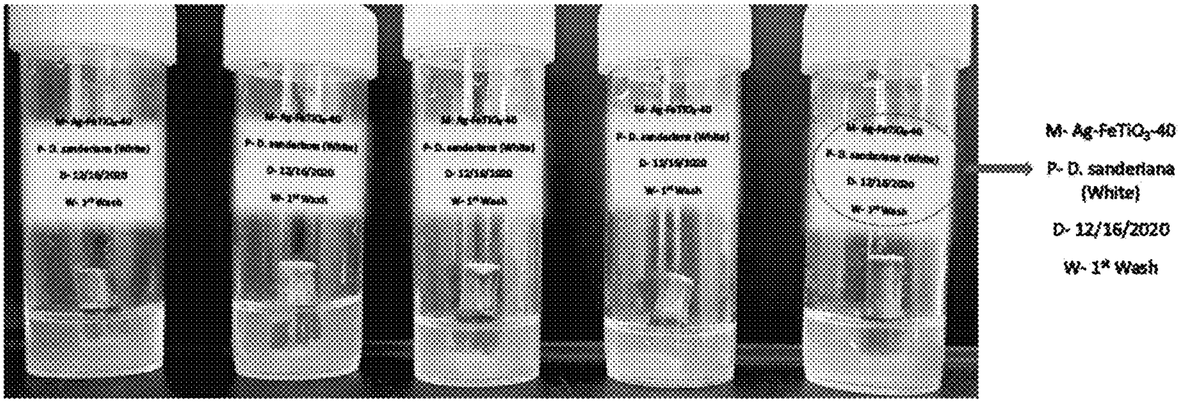
FIG. 11(B)-(I)

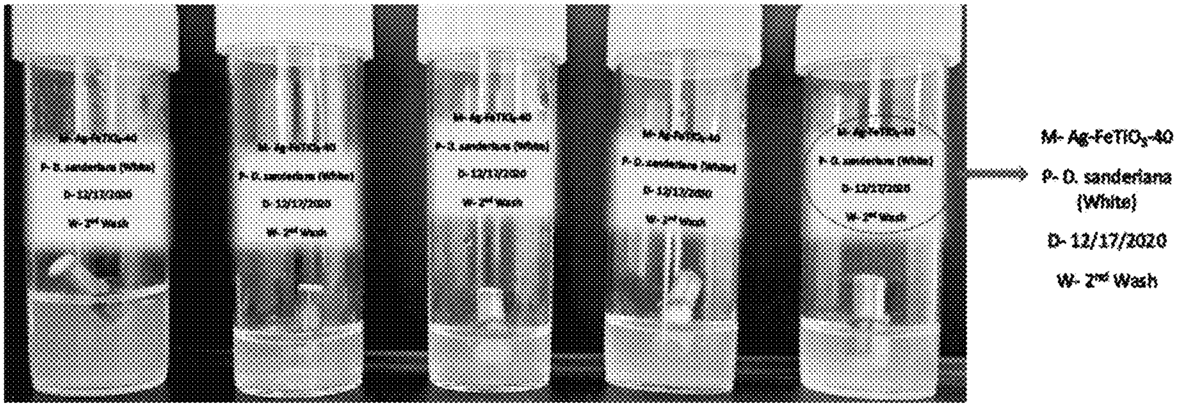
FIG. 11(B)-(II)
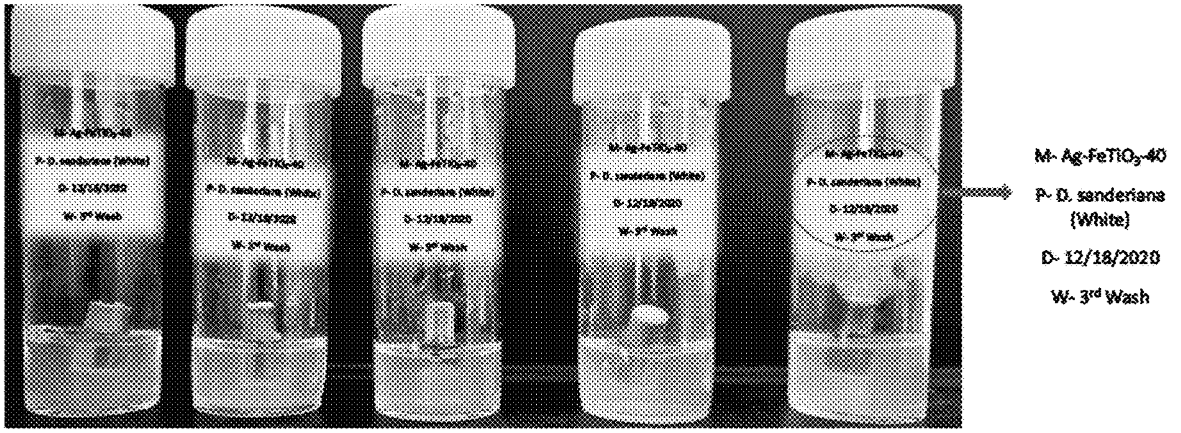
FIG. 11(B)-(III)

METHOD OF MAKING SILVER-IRON TITANATE NANOPARTICLES AND USES THEREOF

CROSS-REFERENCE TO RELATED APPLICATION(S)

This application is a divisional of U.S. application Ser. No. 17/758,821, filed Jul. 14, 2022, which is a National Stage Application, filed under 35 U.S.C. § 371, of International Application No. PCT/IB2021/053178, filed Apr. 16, 2021; the contents of which are hereby incorporated by reference in their entireties.

TECHNOLOGICAL FIELD

The disclosures described herein relate to the synthesis of silver-iron titanate nanoparticles and uses of those nanoparticles in a variety of fields. As compared to prior art methods, the methods disclosed herein provide for the simple, cost-effective synthesis of relatively high-quality silver-iron titanate nanoparticles. These disclosures also provide for the application of the of silver-iron titanate nanoparticles in a variety of important agricultural, industrial, and hygienic uses, including in the important area of plant tissue culture, explant sterilization.

BACKGROUND

Tissue culture is a promising technique that can produce large number of uniform plants with better performance than the mother plant (explant). Seeds, stems, leaves, roots, and buds are the significant parts of explants used to multiply plants in the tissue culture process.

Tissue culture has several benefits over traditional methods of producing plants including the ability to produce a large number of clonal plants, protect strong characters of explant, grow large numbers of plants in a small area, grow healthy plants (without fungus or bacteria), and produce plants with a high plant survival probability.

But tissue culture can also have drawbacks including chronic bacterial/fungus infections in cultured plants in the laboratory, high initial cost, lack of technical knowledge areas, considerable time consumed to grow the plant, and extreme chemical usage.

Many innovations have been introduced in the recent past to overcome these drawbacks and have better-quality productivity. The major drawbacks are bacterial/fungus infections to cultured plants, browning effect, mite attacks, a biotic stress, and human error.

In plant tissue culture mother plants should be selected rigorously. As a results available mother plants are limited. Success in plant tissue culture using these limited number of mother plants is often determined by the absence of fungus/bacterial infections in a tissue culture at all stages of production. Numerous prior disinfection methods of cultivated tissue plants have existed in the prior art. For example, microbial disease can be prevented by following sterilized methods like autoclaving the media, disinfecting planting materials, sterilizing the working tools and area. However, fungus/bacterial infections are common in tissue culture laboratories for various reasons including, but not limited to, human error, unsterilized tools, plant material with endophyte microbes, and unsterilized work areas.

Some of these issues can be addressed with proper training, but endophyte and surface microbes continue to be the industry's major problems. Endophyte and surface microbes can occur for various reasons, including improperly maintained mother plants, low soil quality, and regular pest attacks. For many years others in the prior art have tried and failed to address the problems outlined above in a manner that is effective, simple, environmentally safe, and relatively inexpensive. For example, a common commercial method of surface sterilization includes using a 10% Clorox (sodium hypochlorite) solution, which regularly fails to produce a sufficient percentage of contamination-free cultures. In addition, using a 10% Clorox solution in a sterilization process can damage explant tissues. As a result, explants commonly take longer time to regenerate, show shoot dormancy, and degenerate amino acids. For these reasons, the 10% Clorox method produced low quality and low quantity plants.

The summary of recent patented sterilization methods and its drawbacks are present in Table 1.

TABLE 1

The summary of recent patent sterilization methods

| Patent No & Year | Title | Sterilizing method | Drawbacks |
|---|---|---|---|
| CN1240441C-2006 | Plant tissue cultivation sterilizing method | using a mixture of Clorox (sodium hypochlorite), hydrogen peroxide ($H_2O_2$), and mercury chloride ($HgCl_2$) | Toxic |
| CN104250616A-2014 | Separation method for plant endophyte | $HgCl_2$ | Toxic |
| CN103891713A-2016 | Anti-browning sanitizer for plant tissue culture explant | $HgCl_2$ | Toxic |
| EP2805617A1-2014 | Antibacterial agent against plant disease-causing bacteria | cyanoacrylate polymer particles amended with amino acids, amino acid derivatives, and oligomers | Single use |

TABLE 1-continued

The summary of recent patent sterilization methods

| Patent No & Year | Title | Sterilizing method | Drawbacks |
|---|---|---|---|
| RU2577995C1-2016 | Method of elimination of bacterial infections during plating of cell cultures of plants using silver nanoparticles (Ag NP) | Ag NPs | Costly |
| CN104938334B-2017 | A kind of method of Nano Silver sterilizing Mongolian oak fern spore | Ag NPs | Costly |
| CN102228007B-2013 | Tissue culture method for promoting differentiation and regeneration of soybean cotyledon node explant by using nano material | 75% alcohol & 10% Clorox solution | Plant nodes Burn |
| CN104824829A-2015 | Method for pretreatment of moldy tobacco leaves | activated carbon nanoparticles | Black color |
| CN100450364C-2009 | The liquid composition for promoting plant growth, which includes nano-particle titanium dioxide | Titanium dioxide ($TiO_2$) | Single use |
| CN103864538A-2016 | Production method for moisturizing antibacterial *dendrobium candidum* culture medium containing nano-material | $TiO_2$, $SiO_2$, and ZnO NPs | High temperature used |

SUMMARY OF THE INVENTION

Disclosed herein is a novel method to eradicate bacterial/fungal infections by sterilizing explant nodes with synthesized silver-iron titanate (Ag—$FeTiO_3$) nanoparticles. In an embodiment, natural Ilmenite ($FeTiO_3$) from Sri Lankan beach sand is used as a raw material and ornamental explants are used for tissue cultures. In another embodiment a chemically modified agar medium is used in the tissue culture sterilization process.

In an embodiment of the inventive process, a hand-ground natural Ilmenite ($FeTiO_3$), high titanium Ilmenite, synthetic Ilmenite, or Ti containing Fe material is loaded into a microwave digester vessel (or vessels) along with an excess of concentrated acid (e.g., HCl, $HNO_3$, $H_2SO_4$, $H_3PO_4$, HF) in a ratio between about 1:10 to 1:30. For example, in various embodiments, a concentrated acid is an acid that is at least 25-30% acid by weight and/or by volume. The vessel is then sealed with a lid and inserted into the vessel chamber. Microwave irradiation is then applied to the vessel. In some embodiments the microwave irradiation power is between about 200 W and about 400 W. In some embodiments, the internal temperature of the vessel is between about 80° C. and about 150° C., and preferably between about 90° C. and about 110° C. In some embodiments, the microwave irradiation is carried out for between one and two hours. In other embodiments the microwave irradiation is carried out for between 15 min and 2 hours.

In some embodiments, the microwave reaction vessel is then cooled to about room temperature, and the resulting solution is separated via gravity filtration and stored in a clean dried reagent bottle (e.g., a borosilicate glass bottle). In some embodiments, the unreacted solids are washed with distilled water to remove impurities and excess acid. The washed unreacted solids can preferably be dried at about 80° C. to 150° C. and stored for further digestion.

Compared to conventional digestion methods like the refluxing process, the above-described microwave digestion method is much more efficient since the time needed for acid leaching the Ilmenite is low. The process is also easy to manage and precisely control the temperature during the reaction. Hence, more Ti and impurities like Fe can be effectively leached to the acid solution.

In some embodiments, an aqueous base solution (e.g., NaOH, KOH, $NaHCO_3$, $KHCO_3$, $Ca(OH)_2$, $Mg(OH)_2$, $CaCO_3$, $MgCO_3$, $NH_4OH$) or an OH-containing salt thereof is added to the digested acid solution to perform a hydrolysis reaction. In some preferable embodiments, the bases used are NaOH, KOH, and $NH_4OH$, and their concentrations varied from about 2 to about 5 mol/$dm^{-3}$. In some embodiments the resulting mixture is heated to reach internal temperature of about 60-80° C. In additional embodiments, the mixture is stirred with stirring speed of about 200-1000 RPM using a magnetic stirrer. After the $H^+$ ions have reacted with OH-ions, excess OH-make the mixture basic. In such basic conditions (e.g., pH=7-8), hydrolysis of Ti and key impurities (e.g., Fe) begins. The hydrolysis of Ti and key impurities is completed after reaching pH of 10 and above.

In some embodiments, the residue product is then washed, preferably using a dilute acid (e.g., $HNO_3$) and water (e.g., double distilled, ultrapure, chloride-free water) to remove chloride ($Cl^-$) ions from solids. In various embodiments, a dilute acid is a water-acid solution comprising less than 20-25% acid by weight or volume. In other embodiments, $Cl^-$ ions can be removed by dilute $HNO_3$, which is a solution of $HNO_3$ and distilled water with an acid to water ratio of about 1:4 (either by weight or by volume), and stirring the mixture. The chloride ion removal process can be confirmed by adding 2% Ag ion solution dropwise (typically 1-3 drops) to the washed distilled water solution.

The washed residue is then dispersed in distilled water. In an embodiment, the washed solid is then mixed with a concentration of at least about 10 mg/L (w/v) and preferably about 10 to about 1000 mg/L (w/v) of a water-soluble silver (Ag) salt (e.g., $Ag_2CO_3$, $Ag(NH_3)_2$, $AgNO_2$, $AgNO_3$, $AgCOOCCH_3$). In some embodiments, the mixture is then stirred at a speed of between about 200-600 RPM for between about 10-60 min to obtain a completely homogeneous solution of the above solid. In some preferred embodiments, the Ag concentration is between about 50-250 mg/L (w/v). In some embodiments, the mixture is then put into an ultrasonicator. In some embodiments, the mixture is sonicated by applying an ultrasonic frequency of between about 45-65 kHz for between about 30-60 min (e.g., via the ultrasonicator). In some embodiments, the mixture is heated to a temperature between about 25-35° C. to obtain a well-dispersed nanoparticle solution.

In some embodiments, the sonicated dispersion is dried at between about 80-120° C. for between about 6-12 hours to obtain a product of Ag—$FeTiO_3$ particles. In some embodiments, after drying the product, particles are ground into a fine powder, ultimately calcined at between about 200-700° C. for between about 0.5-5 hours. In a preferred embodiment, the calcination temperature is about 400° C. and the heating period is about 2 hours. In some embodiments, the particle size of the resulting nanoparticles is between 50 nm-500 nm. Once cooled to room temperature, the obtained Ag—$FeTiO_3$ nanoparticle powder can be used in a variety of agricultural, industrial, and hygienic uses.

In some embodiments, the Ag—$FeTiO_3$ nanoparticles are doped with another metal such as Cu, Au, Pt, Zn, Ni, Mn in an amount from 0.1% to 90%. These elements can be doped with $FeTiO_3$ particles without removing $Cl^-$ ions. For example, metal salts such as $CuCl_2$, $CuSO_4$, $Cu(NO_3)_2$ (or others) can be directly added to acid solution and stirred (e.g., for 30 min) followed by adding 5M NaOH to acid solution.

The above-described method presents several advantages compared to the prior art. The above-described method (1) uses a freely available raw material hence, it has a low investment cost; (2) is safe and environmentally friendly; (3) uses an efficient dissolution step, which is enhanced by irradiating microwaves which allows for better reaction control; (4) produces nanoparticles that are active in visible wavelengths due to presence of Fe doped to the $TiO_2$ structure, and which can be activated in the visible wavelength range without the need for additional metal or non-metals to activate the $TiO_2$; (5) is easy to control and uses reaction conditions that are easy to replicate; (6) is easy to develop in mass-scale production; and (7) uses an Ilmenite raw material that can be acid leached multiple times using concentrated acid allowing the process to be repeated without needing entirely new starting materials.

Plant Nodes Pre-Treatment Method

In an embodiment a method of sterilization of explants using the above synthesized Ag—$FeTiO_3$ nanomaterial is provided. In an embodiment, sterilized water is prepared by heating the distilled water, ultrapure water, or ion-free water at about 121° C. with about 1.2 kg/$cm^2$ for about 30 min using an autoclave machine. Sterilized water is used to prepare a suspension of the prepared nanomaterial.

In an embodiment, the explant material is cut into stem sections (e.g., 1-2 cm) using a knife or scissors and put into a beaker with about 200-400 ml distilled water. In an embodiment the stem sections are stirred vigorously to remove dirt, silt, and organic material from the plant node surface. The dirty water is then drained off, and the nodes are separated using a 1 mm pore sized plastic made mesh. In an embodiment, plant nodes are then added to another beaker with about 200-500 ml of distilled water and about 5-10 drops of liquid soap are added. In an embodiment the mixture is then shaken for about 30 min in an orbital shaker with the speed of about 150-300 RPM. This process removes the remaining dirty substances and some microbes as well. In an embodiment all of the remaining liquid is drained and excess soap is removed by washing again with distilled water (e.g., about 200-600 ml again three times).

Sterilization Method of Pre-Treat Plant Nodes

In an embodiment, dried Ag—$FeTiO_3$ nanoparticles are added to sterilized water and mixed. In a preferred embodiment, between about 20 and 50 mg of Ag—$FeTiO_3$ nanoparticles are added to between about 50 and 150 ml of water and mixed by stirring (e.g., with a magnetic stirrer for 5 to 10 min at room temperature with 400-600 RPM stirring speed). Soap washed plant nodes are placed into the stirred nanomaterial dispersed water and stirred. In an embodiment the plant nodes are stirred at between about 400-800 RPM speed for about 15-45 min. In an embodiment, visible light is applied to the plant node. In a preferred embodiment, a visible light source is placed about 50-60 cm height from the beaker bottom surface to achieve a light intensity of about 8000-10,000 lux. In a preferred embodiment, 20 mg of nanoparticles are used with 100 ml of sterilized water, and the mixture of plant nodes with nanomaterial stirring speed is 600 RPM for 30 min, and light intensity is between about 8500-9000 lux.

Sterilization of Tools and Laminar Flow Cabinet

In an embodiment, after the nanoparticle solution is activated with visible light, the beaker is covered with a petri dish or watch glass to avoid any microbial contamination coming from the outer environment. Before inoculation, the outside of the plant node beaker is washed with 75% alcohol solution. In an embodiment an alcohol solution is created using from 75 ml of 100% ethanol or isopropyl alcohol with 25 ml of sterilized water. In an embodiment, the beaker is then inserted in a previously sterilized laminar flow cabinet which supplies continuous filtered airflow. In an embodiment, the laminar flow cabinet is sterilized by applying a UV light source for about 20-30 min. In an embodiment, the tools used (e.g., tissue culturing tools such as forceps and scalpel) are also sterilized (e.g., by heating to 150-180° C. in a hot air oven prior to use). The tools are sterilized intermittently by dipping in 100% ethanol or isopropyl alcohol and burning.

Sterilization of Ag—$FeTiO_3$ Nanoparticles

In an embodiment, the synthesized Ag—$FeTiO_3$ nanomaterial is first dried at about 120-130° C. for about 30-45 min to destroy all microbes and to dry off moisture in the particle surface. After the 1st use of the Ag—$FeTiO_3$ nanoparticles and water mixture (100 ml), the solution can be dried at about 100-120° C. in a hot air oven to remove water and microbes in the particle surface. In an embodiment the dried nanoparticles are stored in a cool, dry container to reuse for the further sterilization steps. These nanoparticles can be used repeatedly (e.g., 2-3 times) to wash plant nodes without further treatments.

Tissue Culture Technique

In an embodiment, the sterilized tools are re-sterilized by dipping in a 100% alcohol solution and burning tips with a flame. Sterilized plant nodes are then taken out from the solution and washed with sterilized water. In an embodiment, washed plant nodes are inserted into sterilized agar media in tubes with a sealed lid. In an embodiment, the tubes are stored at temperatures between 24-25° C., with humidity 50%, the intensity of illumination 1500-2500 lux, and light application time 10-16 hours/day.

Conventional Sterilizing Method of Plant Nodes, Tubes, Glass Jars

As previously mentioned in the background, the Clorox washing technique is the conventional technique for sterilizing plant nodes, tubes, and glass jars. For that, 10% Clorox solution use to wash plant nodes whereas, tubes and jars are washed with 5-10% Clorox solution. The 10% Clorox solution was prepared by adding 20 ml of Clorox solution to 180 ml of distilled water and mixing thoroughly. The 5% Clorox solution was made from 12.5 ml of Clorox solution added to 237.5 ml of distilled water (250 ml solution) or 25 ml of Clorox solution added to 475 ml of distilled water (500 ml solution) and thoroughly mixed. In this prior art Clorox method, plant nodes were initially washed with liquid soap to remove dirt and silt, then washed from 10% Clorox solution 100 ml with 1-2 drop of liquid soap for 15 min in an orbital shaker with a speed of 180 RPM. After 15 min, the liquid was drained and another 100 ml of 10% Clorox solution was added. The mixture was then shaken for 15 min in an orbital shaker. After that, the liquid was then drained and the plant nodes were washed with sterilized water three times to remove excess Clorox. Tubes, jars, and lids were washed with a 5% Clorox solution for 1-3 min by dipping into the Clorox solution. The liquid was again drained and the nodes were removed to air dry. Dried tubes and jars are used to prepare media addition.

The advantages of the methods disclosed herein over the conventional sterilization method are several: (1) the utilization of hard chemicals (such as Clorox) is kept to a minimum; (2) synthesized Ag—$FeTiO_3$ nanomaterial can be reused (in contrast to Clorox); (3) the nanoparticles do not damage the plant nodes; (4) the effectiveness of the nanoparticle sterilization is extremely high; (5) the nanoparticles are easily recoverable; (6) no bad odor; and (7) the method is non-toxic to humans or plants.

Preparation of Chemically Modified Agar Media

In an embodiment, plant nodes are inoculated with specially prepared agar media with conventional chemicals used to prepare agar media. Agar media are prepared by mixing the following chemicals up to 1 L.

(1) Macro (chemical list at table 4)
(2) Micro-I (Chemical list at table 4)
(3) Micro-II (Chemical list at table 4)
(4) Fe source (Chemical list at table 4)
(5) Organic source (Chemical list at table 4)
(6) Myo-Inositol (Chemical at table 4)
(7) BAP-1 mg/L (Chemical at table 4)
(8) Fungicide (Chemical at table 4)
(9) Sugar
(10) Agar
(11) Sterilized water-top up to 1000 ml In an embodiment, after adding the above, the chemical mixture is heated for about 2-3 min at 100° C. in a microwave oven (e.g., LG, Microwave radition-2450 MHz, 1200 W) to dissolve the agar. Approximately 5 ml of media is then poured into the tubes and about 1 L of agar is transferred to 200 tubes and left to settle and solidify the agar media at room temperature (25° C.).

BRIEF DESCRIPTION OF THE DRAWINGS

FIG. 11 is plant nodes of Dracaena sanderiana survived after sterilizing from (A) 10% Clorox, (B) (I) $1^{st}$ wash, (II) $2^{nd}$ wash and (III) $3^{rd}$ wash from Ag—$FeTiO_3$-40, according to an example embodiment;

Table 2 is an X-ray Fluorescent Spectroscopy (XRF) data of synthesized Ag—$FeTiO_3$-40 according to an example embodiment;

Table 3 is an Energy Dispersed Spectroscopy (EDS) data of data of synthesized and Ag—$FeTiO_3$-40 according to an example embodiment; and Table 4 is a Chemical composition of prepared agar media, according to an example embodiment.

TABLE 2

| Material | Element | Weight % |
|---|---|---|
| Ag—$FeTiO_3$-40 | Ag | 2.96 |
| | Fe | 50.98 |
| | Ti | 43.45 |

TABLE 3

| Material | Element | Weight % | Error % |
|---|---|---|---|
| Ag—$FeTiO_3$-40 | Ag | 2.72 | 31.67 |
| | Fe | 35.51 | 4.59 |
| | Ti | 34.09 | 3.45 |
| | O | 26.98 | 12.39 |
| | Cl | 0.61 | 45.36 |

TABLE 4

| Chemicals | Amount in 500 ml stock solution (mg) | Required volume from stock for 1 L agar media |
|---|---|---|
| Macro | | |
| Ammonium Nitrate ($NH_4NO_3$) | 16500 | 50 ml |
| Potassium Nitrate ($KNO_3$) | 19000 | |
| Potassium Phosphate ($KH_2PO_4$) | 1700 | |
| Magnesium Sulphate ($MgSO_4 \bullet 7H_2O$) | 3700 | |
| Calcium Chloride ($CaCl_2 \bullet 2H_2O$) | 4400 | |
| Micro-I | | |
| Boric Acid ($H_3BO_3$) | 620 | 5 ml |
| Manganese Sulphate ($MnSO_4 \bullet 7H_2O$) | 2230 | |
| Zinc Sulphate ($ZnSO_4 \bullet 7H_2O$) | 860 | |
| Micro-II | | |
| Potassium Iodide (KI) | 83 | 5 ml |
| Sodium Molybdate ($Na_2MoO_4 \bullet 2H_2O$) | 25 | |
| Cupric Sulphate ($CuSO_4 \bullet 5H_2O$) | 2.5 | |
| Cobalt Chloride ($CoCl_2 \bullet 6H_2O$) | 2.5 | |
| Ferrous Source | | |
| $Na_2EDTA \bullet 2H_2O$ | 372 | 5 ml |
| Ferrous Sulphate ($FeSO_4 \bullet 7H_2O$) | 278 | |
| Organics | | |
| Glycine | 200 | 5 ml |
| Niacin | 50 | |
| Pyridoxine•HCl | 50 | |
| Thiamine•HCl | 10 | |
| Vitamin | | |
| Myo-Inositol | 100 mg/L | 100 mg |
| Fungicide | | |
| folicur tebuconazole EW | 250 g/L | 5 µl |
| Other Ingredients | | |
| White Sugar | — | 30 g |
| Agar powder | — | 4.5 g |

DETAILED DESCRIPTION

The following description provides detailed embodiments of various implementations of the invention described herein. After reading this description, it will become apparent to one skilled in the art how to implement the invention in various alternative embodiments and applications. However, various embodiments of the present invention will be described herein, it is understood that these embodiments are presented by way of example only and not limitation. As such, the detailed description of embodiments should not be construed to limit the scope or the breadth of the invention.

Example 1: Process of Synthesizing Ag—$FeTiO_3$-40

Figure 1:
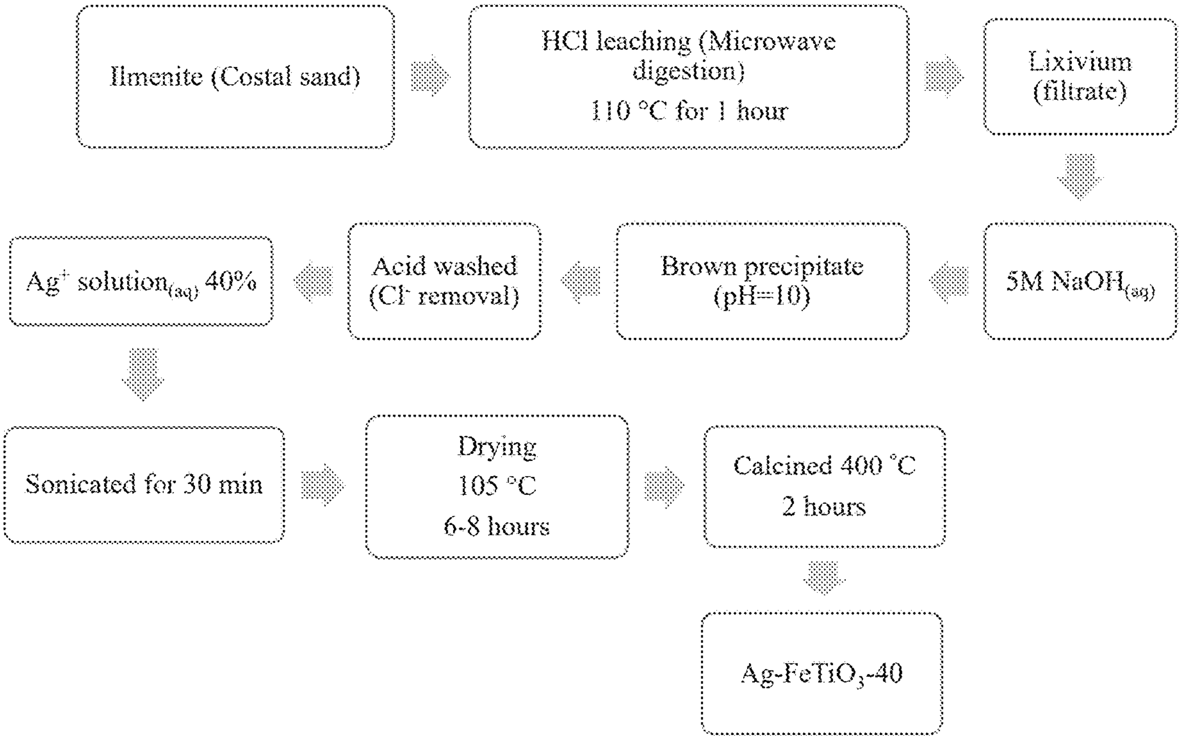
FIG. 1 is a process flow diagram of the Ag—$FeTiO_3$-40 synthesizing process, according to an example embodiment.

With reference to FIG. 1, in an example embodiment, approximately 5.00 g of Ilmenite was added to Teflon vessels in a microwave digester (e.g., ETHOS EASY, Milestone, Italy, 1800 W). Between about 10 and 15 ml of concentrated HCl (12.1 M) was then added to each of the ten vessels containing Ilmenite. In this example embodiment, the vessels were then sealed with Teflon caps, inserted into the vessel holder, and inserted into the reactor chamber. In various embodiments, the microwave reactor was run using between about 250 W to 300 W at a 90 bar pressure for about 1 hour. The temperature of about 110° C. was maintained during this time. In an example embodiment, generated HCl gas was emitted via a non-corrosive gas tube connected to the reactor. In an example embodiment, after removing the vessels from the chamber, the liquid fraction was carefully separated from solid Ilmenite and poured into a borosilicate glass bottle. The collected lixivium (filtrate) was utilized to synthesize Ag—$FeTiO_3$-40 nanoparticles.

In this example embodiment, this separated acidic solution (about 100 ml from the 10 vials) was neutralized with 5 M NaOH (aq) via drop-wise addition (rate=0.5 ml/min) to the mixture with vigorously stirring and boiling by using a magnetic stirrer at 150° C. in a 1 L beaker. The pH was adjusted to 10 by adding NaOH continuously to the lixivium, which was determined using pH paper. The brown color particles were formed when pH reached up to 8; excess NaOH was added to the obtained complete brown color solution (pH=10). After that, the mixture was stirred for another 4 hours to obtain a well-homogenized solution. In other embodiments of this example, the mixture was stirred for 2 hours, 1 hour, 30 minutes, and 15 minutes. Then solution was then aged at room temperature (e.g. aging for 1 hour, aging for 4 hours, aging for 12 hours, aging for 24 hours, etc.). During aging brown solid particles separated from the liquid and settled at the bottom of the beaker. After that, excess NaOH was carefully removed without disturbing the brown residue. The following reactions indicated in equation 1-7 occurred in the acid-base reaction step.

$$H^+ (aq) + OH^- (aq) \longrightarrow H_2O (l)$$

(2)

$$TiO^{2+} (aq) + 2H_2O (l) \longrightarrow H_2TiO_3 (s) + 2H^+ (aq)$$

(3)

$$TiO^{2+} (aq) + 2NaOH (aq) \longrightarrow Na_2TiO_3 (s) + 2H^+ (aq)$$

(4)

$$Fe^{3+} (aq) + 3NaOH (aq) \longrightarrow Fe(OH)_3 (s) + 3Na^+ (aq)$$

(5)

$$TiO^{2+} (aq) + Fe^{3+} (aq) + 2H_2O + e^- \longrightarrow FeTiO_3 (s) + 4H^+$$

(6)

$$3Ti^{4+} (aq) + 2Fe^{3+} (aq) + 9H_2O (l) \longrightarrow Fe_2Ti_3O_9 (s) + 18H^+ (aq)$$

(7)

$$2Na_2TiO_3 (s) + 4H^+ (aq) \longrightarrow 2TiO^{2+} (aq) + 4OH^- (aq) + 4Na^+ (aq) \longrightarrow Ti(OH)_4 (s) + 4Na^+ + TiO_2$$

In this example embodiment, the mixture was then washed with dilute (0.1 mol/dm$^{-3}$) $HNO_3$ 100 ml and 400 ml of distilled water. This step was repeated until $Cl^-$ ions were removed from the solid particles. Removal of the $Cl^-$ ions was confirmed using 2% silver nitrate ($AgNO_3$) solution. At the final wash, the white color residue was not formed with 2% $AgNO_3$, and it confirmed solids were free from $Cl^-$ ions, and a maximum volume of 200 ml was obtained after the washing step. This $Cl^-$ free brown precipitate was utilized to prepare Ag—$FeTiO_3$-40 nanoparticles.

In this example embodiment, a silver solution was made from dissolving $AgNO_3$ 25 mg in 100 ml distilled water. Ag—$FeTiO_3$-40 nanoparticles were synthesized by mixing 40% volume fractions (silver concentration equal to 100 mg/L) to the $Cl^-$ free brown precipitate. The samples were then ultrasonicated for about 30 min by using a sonicator (e.g., GT Sonic-3 L, 45 kHz, 30° C., ultrasonic power of 100

W). Sonicated liquid mixtures were then dried at about 105° C. in a hot air oven for between about 6 and 8 hours to remove water. Ultimately, the dried solid was ground to fine particles using a mortar and a pestle, calcined at 400° C. for 2 hours to obtain Ag—$FeTiO_3$-40. In other example embodiments, the calcination step took place at temperatures between 200° C. and 700° C. for between 0.5 and 5 hours. During the calcination step, the following reactions occurred (equations 8-12).

$$Ti(OH)_4\ (s) \xrightarrow{\Delta} TiO_2\ (s) + 2H_2O\ (l) \quad (8)$$

$$H_2Ti_3O_7\ (s) \xrightarrow{\Delta} 3TiO_2\ (s) + H_2O\ (l) \quad (9)$$

$$2Fe(OH)_3\ (s) \xrightarrow{\Delta} Fe_2O_3\ (s) + 3H_2O\ (l) \quad (10)$$

$$4AgNO_3\ (aq) + O_2\ (g) \longrightarrow 2Ag_2O\ (s) + 4NO_2\ (g) + 2O_2\ (g) \quad (11)$$

$$2AgNO_3\ (aq) + 2FeTiO_3\ (s) \longrightarrow 2Ag{-}FeTiO_3\ (s) + 2NO_2\ (g) + O_2\ (g) \quad (12)$$

Characterization of Synthesized Ag—$FeTiO_3$-40

Figure 2:
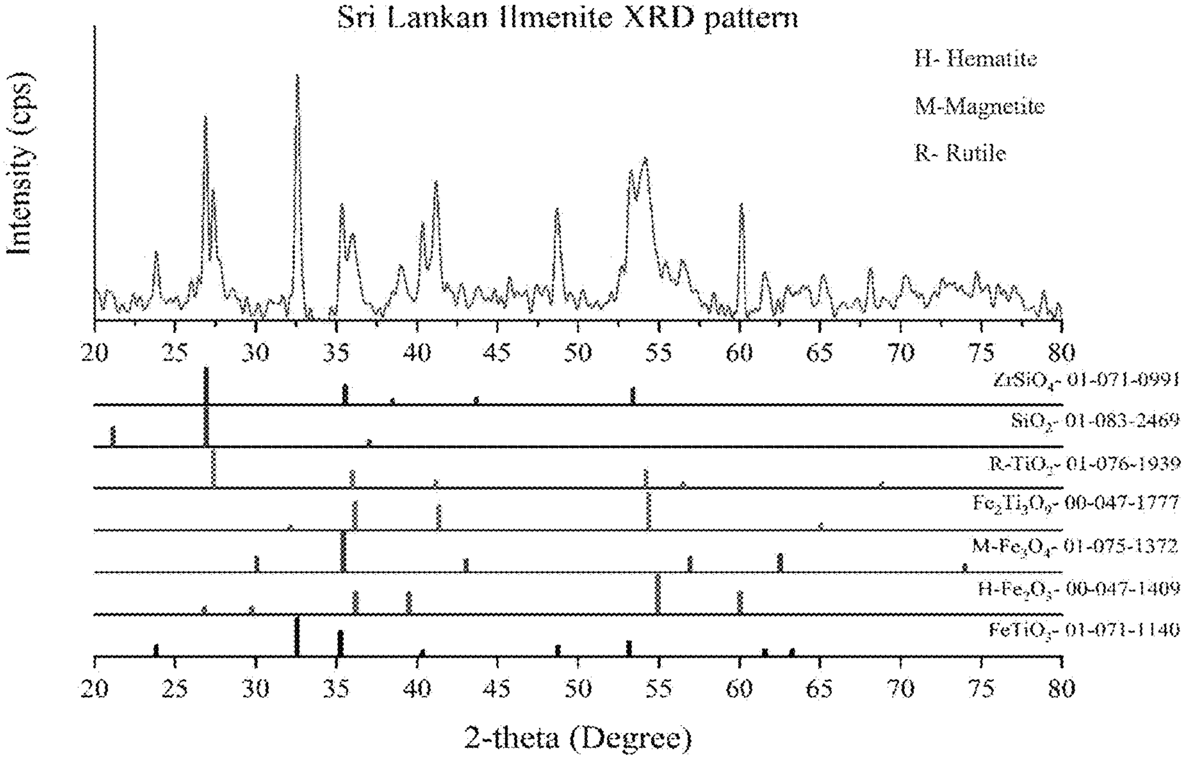
FIG. 2 is a Powder X-ray diffraction (PXRD) pattern of Sri Lankan Ilmenite (Beach sand), according to an example embodiment.
Figure 3:
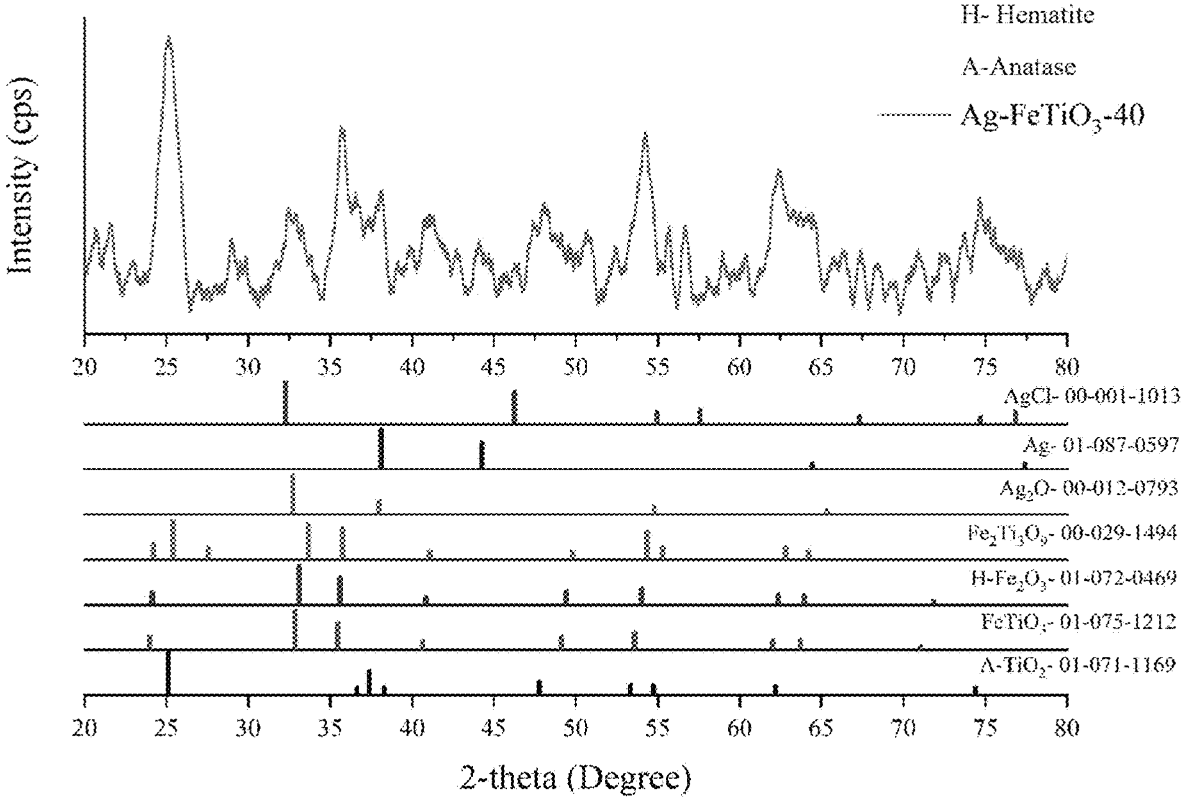
FIG. 3 is a Powder X-ray diffraction of synthesized Ag—$FeTiO_3$-40 via HCl acid leaching, according to an example embodiment.

FIG. 2 is the powder X-ray diffraction (PXRD) pattern obtained using the Rigaku Ultima-IV XRD machine for Sri Lankan Ilmenite. It shows, Ilmenite ($FeTiO_3$), Magnetite ($Fe_3O_4$), Hematite ($Fe_2O_3$), Rutile ($TiO_2$), Pseudorutile ($Fe_2Ti_3O_9$), Quartz ($SiO_2$), and Zircon ($ZrSiO_4$). This PXRD analysis suggests that the Sri Lankan Ilmenite sample not pure with various other minerals also present in the Ilmenite. The PXRD patterns of the product obtained for Ag—$FeTiO_3$-40, as shown in FIG. 3. According to the FIG. 3 identified peaks in the diffractogram clearly emphasize the presence of the Anatase ($TiO_2$), synthesized Ilmenite ($FeTiO_3$), Hematite ($Fe_2O_3$), Pseudorutile ($Fe_2Ti_3O_9$), Silver oxide ($Ag_2O$), Silver chloride (AgCl), and metallic Ag. The EDX data confirm minor Ag metal, AgCl, $Ag_2O$, and Ti, Fe, O elements in the photocatalyst (FIG. 5 & Table 2).

Figure 4:
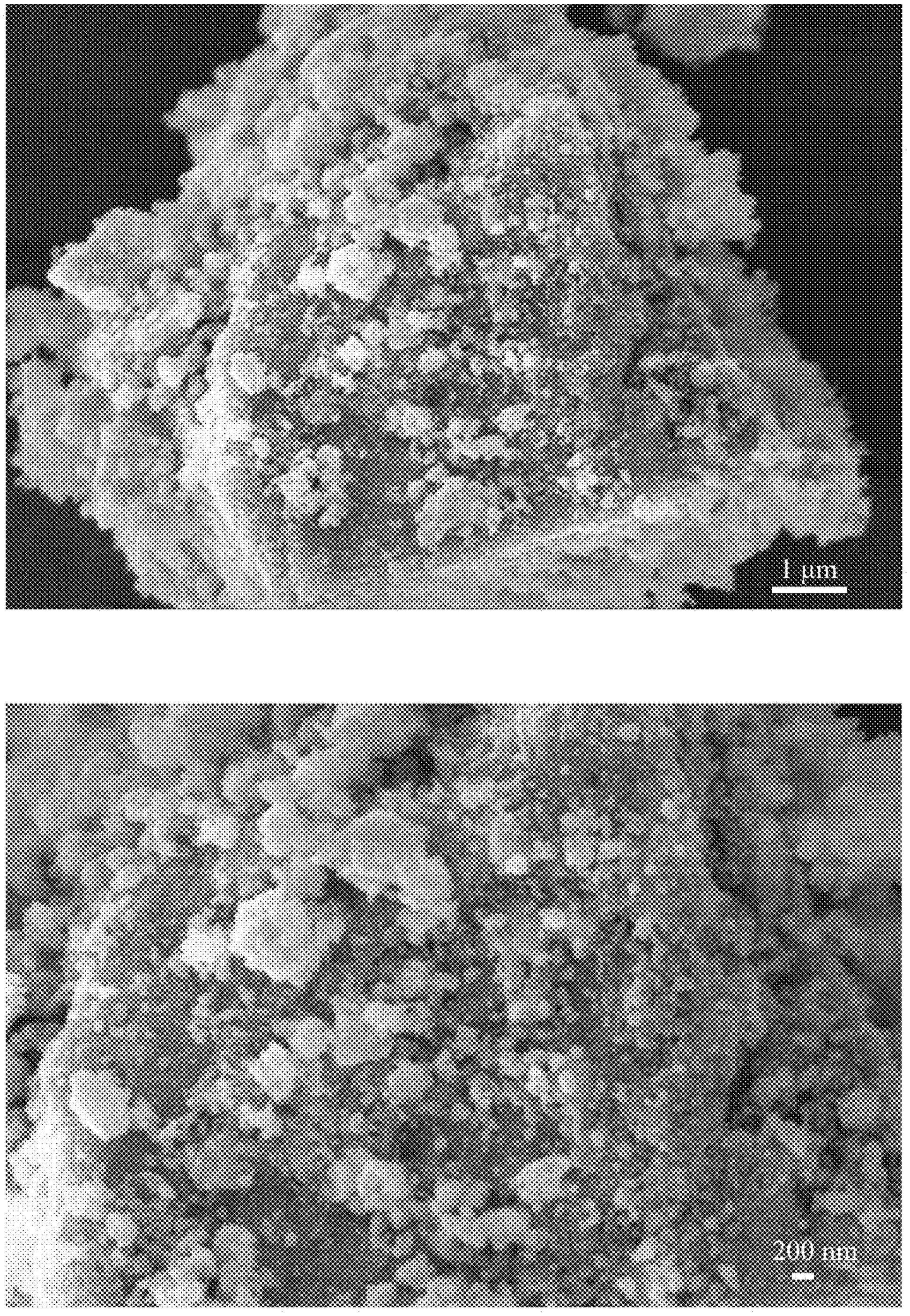
FIG. 4 shows Scanning Electron Microscopy (SEM) images of the synthesized Ag—$FeTiO_3$-40, according to an example embodiment.

FIG. 4 shows a Scanning Electron Microscopy (SEM) image (Carl ZEISS EVO 18 Research) of the synthesized Ag—$FeTiO_3$-40 solid particles. FIG. 4 shows the morphology of the product Ag—$FeTiO_3$-40. Furthermore, FIG. 4 shows nanoparticles present in the large surface area of a particle.

Figure 5:
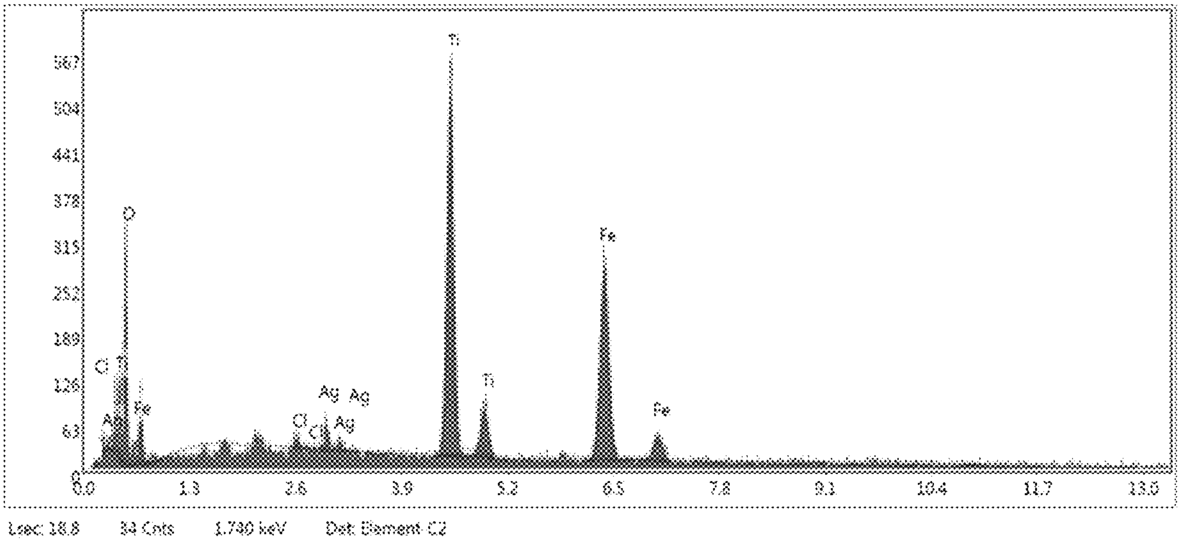
FIG. 5 shows energy dispersive X-ray (EDS) mapping of synthesized Ag—$FeTiO_3$-40, according to an example embodiment.

Ag decorated $FeTiO_3$ is observed in the EDX elemental mapping image taken by using Element EDAX analyzer is shown in FIG. 5. While areas related to Ag are not observed in the product (FIG. 5). Only a very minor amount of Ag is present in the $FeTiO_3$ solids, approximately 2.72% oxygen in the EDX analysis. Both graphs show the nominal amount of Chloride ($Cl^-$) ions in the particles. That confirms the presence of AgCl identified in the XRD pattern in the Ag—$FeTiO_3$-40 product.

The $Cl^-$ present in the solids was not completely removed via the simple acid washing steps. Thus some AgCl with Ag ions was formed by following reaction (13):

$$Ag^+\ (aq) + Cl^-\ (aq) \longrightarrow AgCl\ (s) \quad (13)$$

Figure 6:
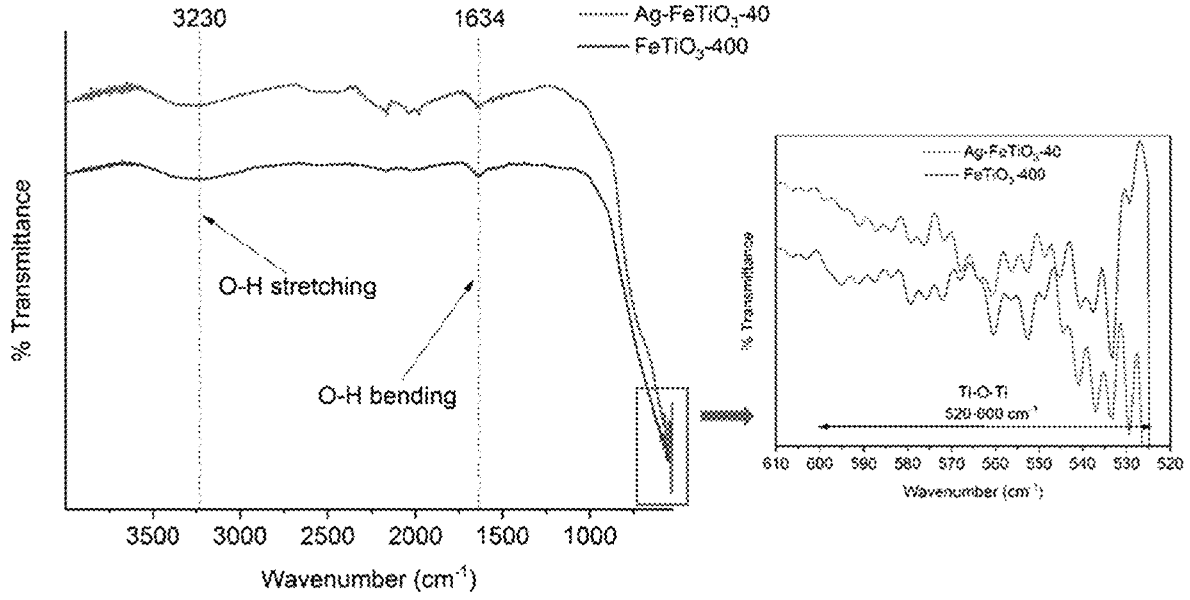
FIG. 6 shows Fourier Transmission Infrared Spectroscopy (FTIR) of synthesized Ag—$FeTiO_3$-40, according to an example embodiment.

FIG. 6 shows FTIR analysis of synthesized Ag—$FeTiO_3$-40. FTIR experiments were carried out to characterize Ag—$FeTiO_3$-40 using Thermo Scientific Nicolet S10 with the attenuated total reflectance (ATR) method. Few characteristic peaks are observed in the 520-600 $cm^{-1}$ region, the Ti—O—Ti bonds in $FeTiO_3$ solids. In the IR spectrum, the peak at 3230 $cm^{-1}$ is attributed to the O—H stretching vibration peaks. The peaks appear at 1634 $cm^{-1}$, which corresponds to the O—H bending vibration.

Figure 7A:
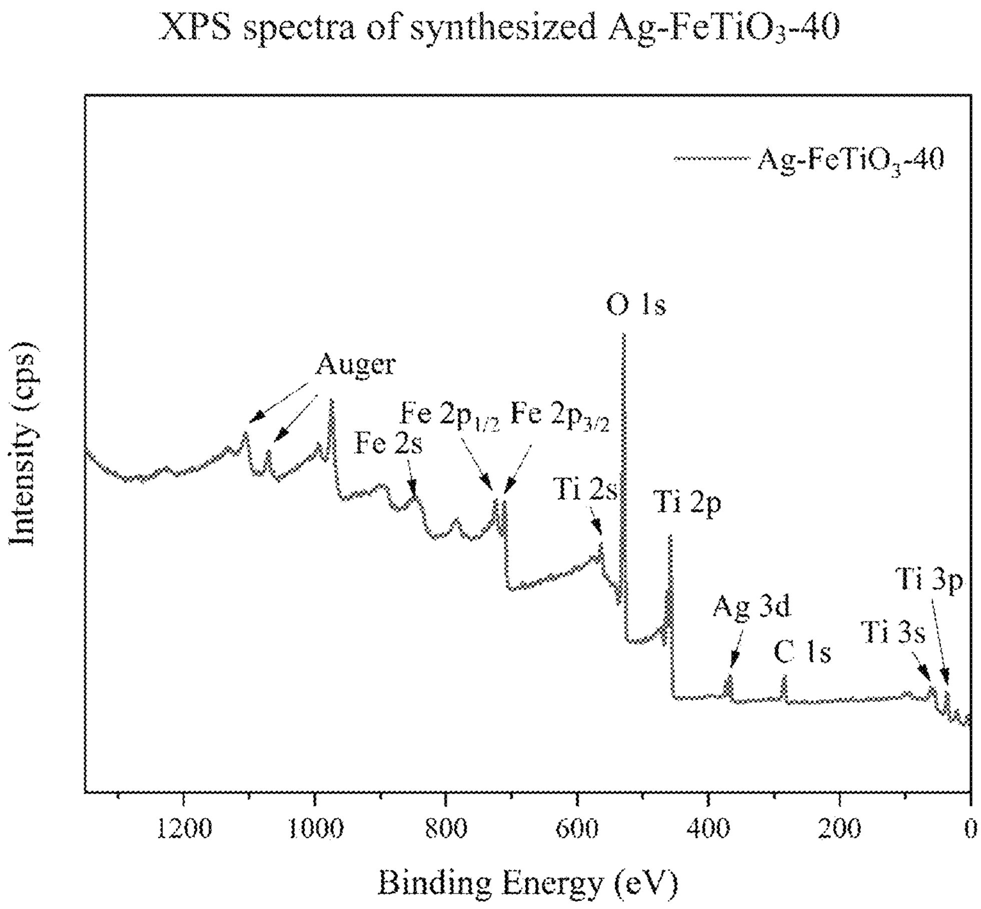
FIG. 7 shows X-ray photoelectron spectroscopy (XPS) spectra of (A) synthesized Ag—$FeTiO_3$-40 (B) Elemental binding energy of Ag—$FeTiO_3$-40 according to an example embodiment.
Figure 7B:
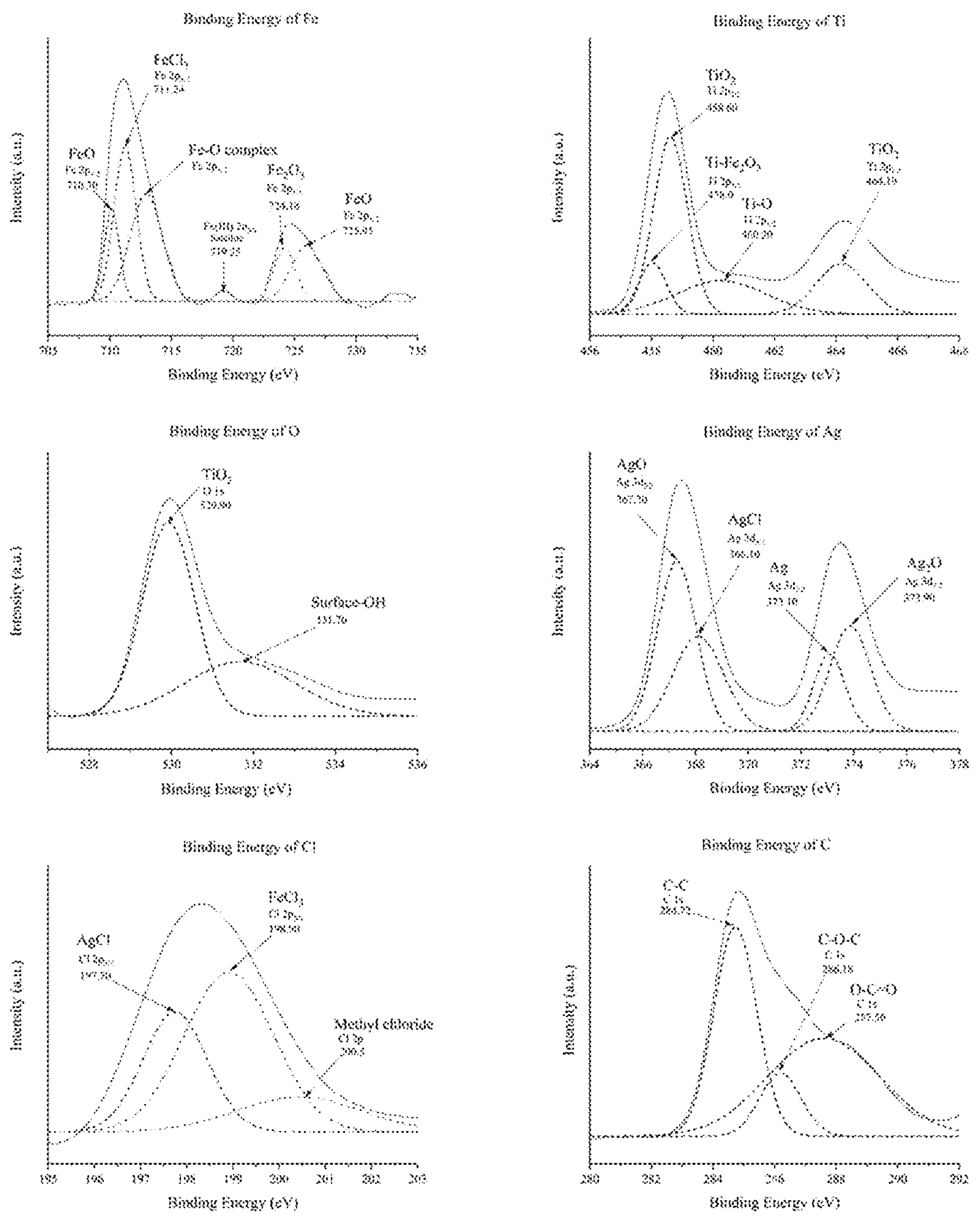

FIGS. 7(A & B) shows that X-ray Photoelectron Spectroscopy (XPS) analysis was done using Thermo Scientific ESCALAB. In the present study, XPS is used to investigate the surface properties of synthesized Ag—$FeTiO_3$-40. Major peaks are observed for synthesized Ag—$FeTiO_3$-40 at 711.24 eV for Fe($2p_{3/2}$), 724.18 eV for Fe($2p_{1/2}$), 529.90 eV for O (1s), 458.60 eV for Ti ($2p_{3/2}$), 198.90 eV for Cl ($2p_{3/2}$) and 284.72 eV for C (Is). Ag to synthesized $FeTiO_3$ particles Ag peaks also appeared in Ag—$FeTiO_3$-40 a pronounced peak is observed at 367.30 eV for Ag($3d_{5/2}$), indicating the silver presence as oxides, chloride and Ag° (s) as well.

Figure 8:
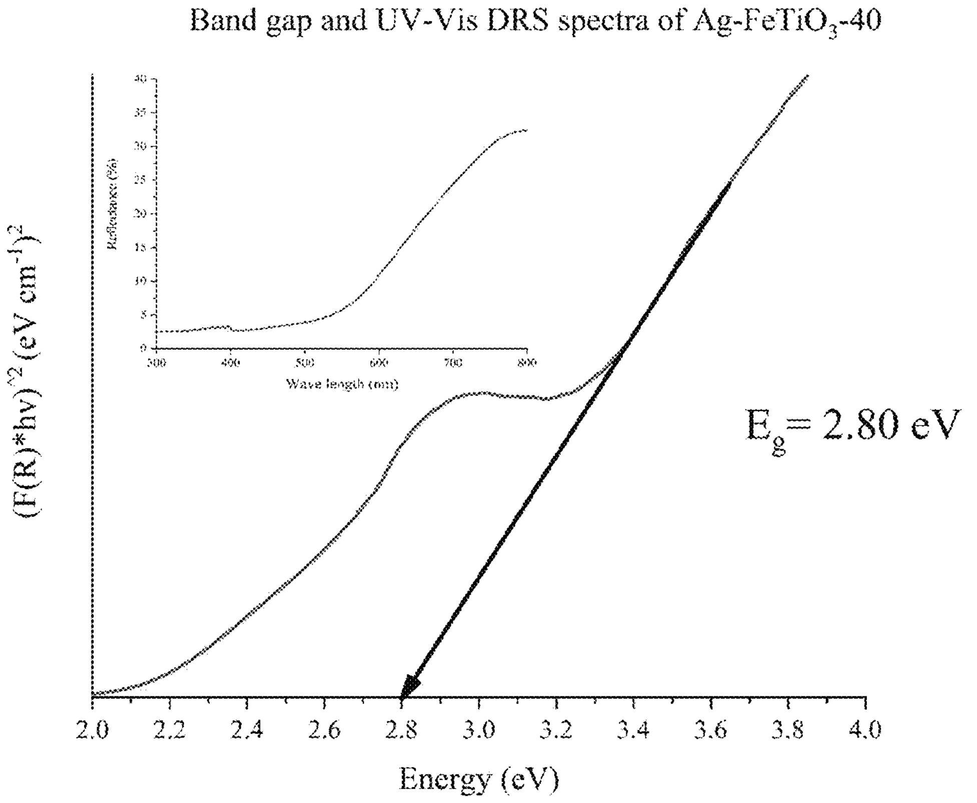
FIG. 8 shows Band gap and UV-Vis DRS spectra of synthesized Ag—$FeTiO_3$-40 according to an example embodiment.

FIG. 8 shows UV-Vis DRS analysis using PerkinElmer Lambda 365 UV-Vis spectrometer for synthesized Ag—$FeTiO_3$-40 nanoparticles. UV-Vis diffuse reflectance spectra (UV-Vis DRS) prepared for synthesized Ag—$FeTiO_3$-40 data using the Kubelka-Munk method. The plotting of $[(R) xhv]^n$ as a function of photon energy, n=2 used to obtain the direct band gap energy ($E_g$) of Ag—$FeTiO_3$-40, which corresponds to the value of $E_g$ extrapolated to α=0, where F(R) is the Kubelka-Munk function. Calculated band gap energies of synthesized Ag—$FeTiO_3$-40 is 2.80 eV. The presence of metallic impurities in the final product may significantly affect the band gap of Ag—$FeTiO_3$-40 from the UV absorption to the visible range. Absorption edges for synthesized Ag—$FeTiO_3$-40 samples are located at 728 nm. The UV-Vis absorption spectrum is calculated from diffuse reflectance and Fe oxide (Hematite) in the sample matrix leading to a significant red shift of optical response towards the visible light due to reduced band gap energy.

Table 2 is the XRF analysis (HORIBA Scientific XGT-5200) showed that Ag—$FeTiO_3$-40 contain Ag 2.96%, Ti 43.45% and Fe 50.98%. XRF results confirms the presence in Ag in the Ag—$FeTiO_3$-40 material which proves the EDS analysis (Table 2).

Table 3 is the elemental analysis data based on energy dispersive X-ray spectroscopy (EDX data) of the product Ag—$FeTiO_3$-40. The EDX data obtained confirm that there is a high percentage of Ti 34.09%, Fe 35.51%, O 26.98% and minor Ag 2.72% in Ag—$FeTiO_3$-40 and Cl-present in sample.

Table 4 indicates the chemical composition of modified agar media for tissue culture experiment. An agar medium was prepared by addition of necessary volume and mass of mention chemicals in table 3. Afterward, agar medium was poured into 200 tubes and utilized for a tissue culture test. In some embodiments, a minor amount of Fungicide (folicur tebuconazole) was also added to prevent endophyte fungus from growing in the cultured tubes. The fungicide inhibits the growth spores and mycelium of the endophyte fungus.

Example 2: Sterilization of Dracaena Sanderiana Plant Nodes

Figure 10:
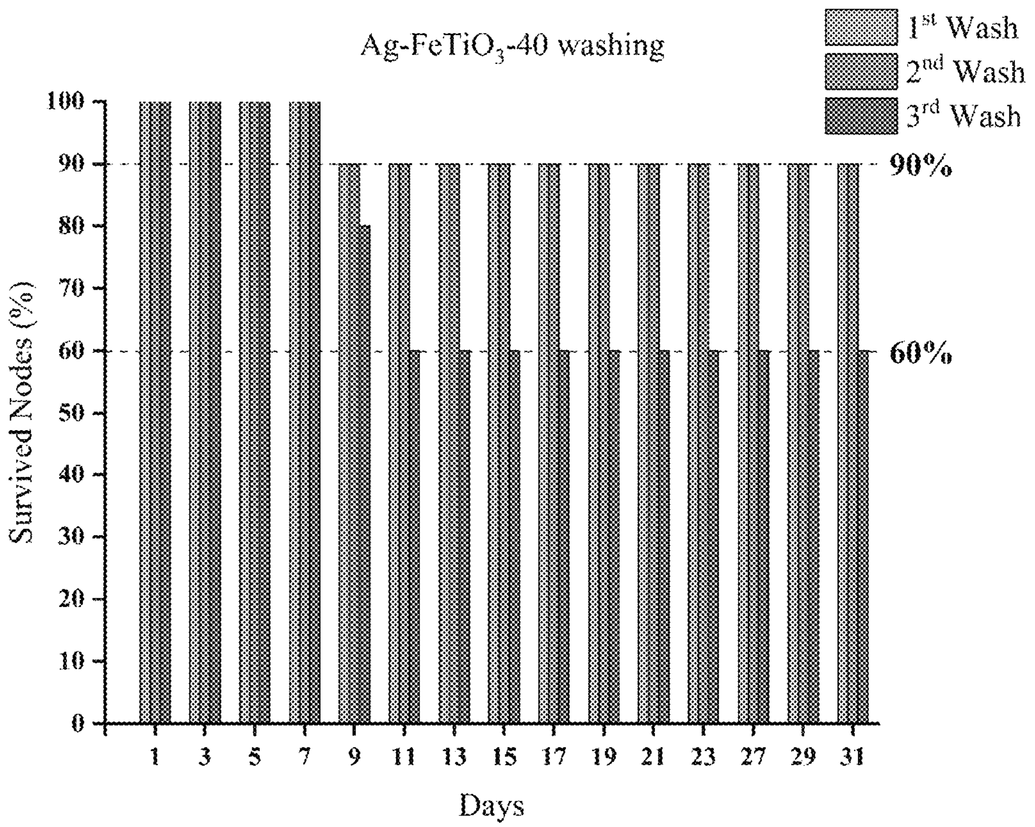
FIG. 10 is a bar graph of Dracaena sanderiana ornamental plant nodes survived after using synthesized Ag—$FeTiO_3$-40, according to an example embodiment.

In an exemplary embodiment, Dracaena sanderiana ornamental plant stem segments (Nodes) were sterilized using Ag—$FeTiO_3$-40 nanoparticles as follows. First, the plant was washed. In an exemplary embodiment liquid soap (about 10 drops) and water were used to rinse the nodes via shaking at about 180 RPM for about 30 minutes. Then, the soapy water was drained off and the nodes were washed with sterilized water 3 times. Next, about 20 mg of Ag—$FeTiO_3$-40 was added to 100 ml of sterilized water and stirred (Speed=600 RPM) for about 30 minutes with direct visible light (50 W Warm white light) with the height of about 50 cm and intensity about 8500-9000 lux. After that, the explant was inoculated and cultured as described in Table 3 with 10 explants in every culture tube. Afterwards inoculated tubes were stored between 15 and 25° C. and 1500 lux fluorescent light, illumination 12h/d for 31 days. The results are presented in FIG. 10.

Figure 9:
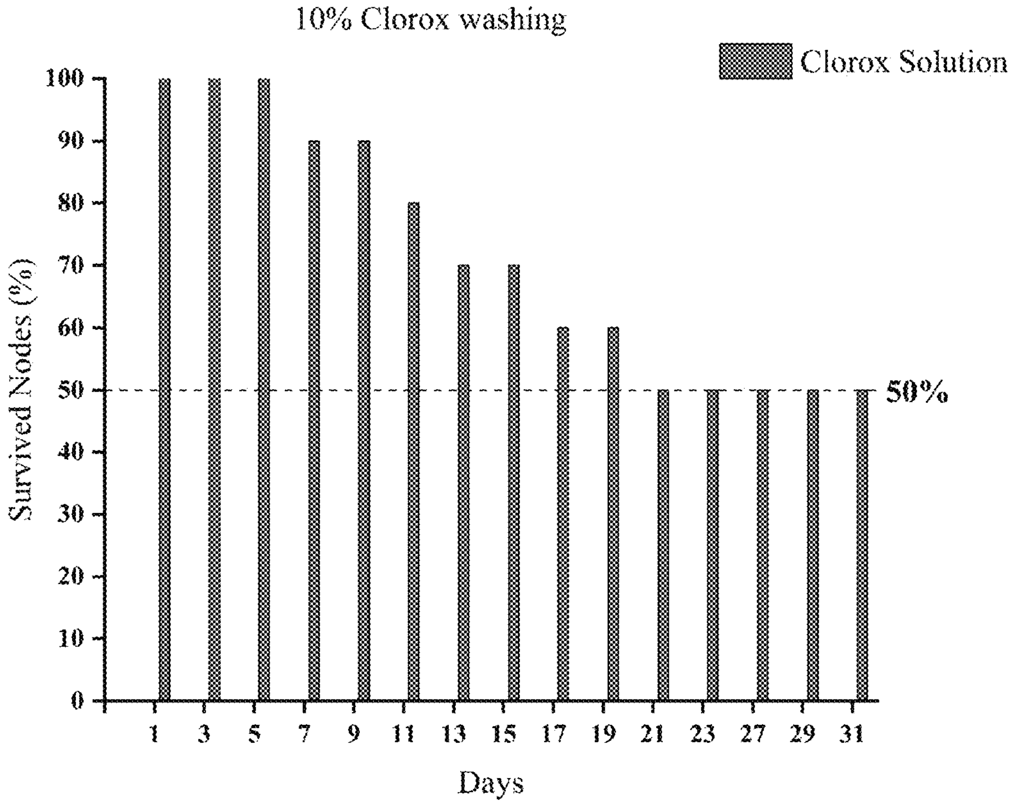
FIG. 9 is a bar graph of Dracaena sanderiana plant nodes survived percentage of using Clorox solution, according to an example embodiment.

A comparison with a common prior art method using Clorox is presented in FIG. 9, which shows the survival statistics for plant nodes washed in a 10% Clorox solution. In that comparison Clorox washing method, the disinfection process is done using the following methods of soaking disinfection: (1) Plant nodes were washed in 100 ml volume of 10% Clorox solution for 15 minutes with two drops of liquid soap by shaking the mixture with the speed of 180 RPM. The solution was then discarded. (2) Another 10% Clorox 100 ml volume soaked for 15 minutes, shaken, and the solution is discarded. (3) The plant nodes were then rinsed with sterilized water for 3 times. After that, explants were inoculated and cultured using the component provided in Table 3 with 10 explants for every culture tube. Afterwards, the inoculated tubes were stored for 31 days between 15 and 25° C. with a 1500 lux fluorescent light, illumination 12h/d. The results are shown in FIG. 9.

After one month, results show 90% of plants nodes survived by sterilizing from Ag—$FeTiO_3$-40 for 2 washing cycles (FIG. 11(B)-(I-II)), which means; out of 20 plant nodes, 18 nodes survived, and 60% of plant nodes survived a $3^{rd}$ washing (FIG. 11(B)-(III)). This means that out of 10 nodes, 6 nodes survived. In the comparison prior art Clorox sterilizing technique, only 50% of plant nodes survived at one month (FIG. 11(A)). This suggests that the Clorox method was unable to eradicate fungus/bacteria for half of cultured nodes (5 nodes). Thus, suggest present invention is a more reliable sterilizing method compared with the Clorox solution. Moreover, the tissue culture industry might be benefitted due to this innovation because of less contamination obtained from bacteria and fungus growth in cultured media. Accordingly, this innovation can be useful for fungus and bacterial attacks in tissue culture technology without using toxic chemicals like mercury chloride. This high success rate will lead to save considerable amount of expenditure and time.

Although the various embodiments have been illustrated and described herein with reference to preferred embodiments and specific examples thereof, it will be clear to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

Many modifications and other embodiments set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of sanitizing a plant comprising:

a. applying Ag—$FeTiO_3$ nanoparticles to the plant; and b. activating the applied Ag—$FeTiO_3$ nanoparticles using a visible light source.

2. The method of claim 1 wherein the plant is washed before the Ag—$FeTiO_3$ nanoparticles are applied.

3. The method of claim 2 wherein the plant is washed with a surfactant.

4. The method of claim 1 wherein the Ag—$FeTiO_3$ nanoparticles are applied in a solution.

5. The method of claim 1 wherein the sanitized plant is a plant node for use in tissue culture.

6. The method of claim 5 wherein the Ag—$FeTiO_3$ nanoparticles kill plant node microbes without damaging plant growth.

7. The method of claim 5 wherein the plant node is placed in an agar medium after sanitization.

8. The method of claim 1 wherein the Ag—$FeTiO_3$ nanoparticles are reused to sanitize another plant.

9. The method of claim 1 wherein the sole sanitation agent is the Ag—$FeTiO_3$ nanoparticles activated by the visible light source.

* * * * *